United States Patent [19]

Hayes

[11] 4,063,819

[45] Dec. 20, 1977

[54] HIGH ENERGY LASER POINTING AND TRACKING SYSTEM UTILIZING BEAM ANGLE/FOCUS DITHER METHOD OF OPERATION

[75] Inventor: Cecil L. Hayes, Placentia, Calif.

[73] Assignee: The United States of America as represented by the Secretary of the Air Force, Washington, D.C.

[21] Appl. No.: 718,272

[22] Filed: Aug. 27, 1976

[51] Int. Cl.² .............................................. G01B 11/26
[52] U.S. Cl. ................................. 356/152; 250/203 R; 350/6; 356/5
[58] Field of Search .................... 356/5, 141, 152, 153, 356/172, ; 350/6; 250/203 R, 338

[56] References Cited

U.S. PATENT DOCUMENTS

| 3,346,738 | 10/1967 | Rogers et al. | 250/203 R |
|---|---|---|---|
| 3,504,979 | 4/1970 | Stephany | 356/172 |
| 3,514,776 | 5/1970 | Mulready | 343/6 R |
| 3,644,043 | 2/1972 | Jones et al. | 250/203 R |
| 3,727,223 | 4/1973 | O'Meara | 343/7.5 |
| 3,731,103 | 5/1973 | O'Meara | 356/5 |
| 3,864,043 | 2/1975 | Russell | 356/172 |
| 3,875,402 | 4/1975 | Parkin | 250/338 |
| 3,961,179 | 6/1976 | Kuffer | 250/203 R |
| 3,967,899 | 7/1976 | O'Meara | 356/152 |

OTHER PUBLICATIONS

Vogel et al., Electronics, Nov. 10, 1961, pp. 81–85.

*Primary Examiner*—S. C. Buczinski
*Attorney, Agent, or Firm*—Joseph E. Rusz; Willard R. Matthews, Jr.

[57] ABSTRACT

Optimum energy delivery in a high energy laser system is realized by intensity modulating the transmitted laser beam and demodulating the received reflected laser energy to obtain phase error signals. The error signals are used by a servo system to direct the transmitted beam. Beam intensity modulation is accomplished by angle/focus dither. In systems having relatively small slewing or scanning mirrors the angle dither is accomplished by manipulating the mirror itself. For systems having large slewing mirrors a small aperture mirror is positioned adjacent to the slewing mirror and used to impart the required dither to a small portion of the transmitted laser beam.

2 Claims, 3 Drawing Figures

HIGH ENERGY LASER POINTING AND TRACKING SYSTEM UTILIZING BEAM ANGLE/FOCUS DITHER METHOD OF OPERATION

STATEMENT OF GOVERNMENT INTEREST

The invention described herein may be manufactured and used by or for the Government for governmental purposes without the payment of any royalty thereon.

BACKGROUND OF THE INVENTION

This invention relates to high energy tracking laser optical systems, and in particular to a method and means for obtaining optimum energy delivery in such systems.

The delivery of high energy laser beam energy to a target requires precise pointing and tracking as well as lead angle compensation for high velocity targets. The basic function of high energy laser REL) optical systems used to accomplish this is the delivery of the desired level of power to the target in an optimal manner. Among the factors which determine the performance of such a system are the quality of the optics and the acquisition/tracking subsystem. Recently, adaptively controlled components have been used to improve the system performance of both areas. Continuous, deformable mirrors, as well as segmented, multi-aperture mirrors operating within either the phase conjugate or multidither algorithms have been mechanized and demonstrated. Improvement in optical performance has matched theoretical predictions for both beam quality and target acquisition/tracking in the presence of turbulence. However, improved operation has been achieved at the expense of additional complexity (optical and electronic). The present invention is directed toward providing an adaptive system which can attain the goal of optimum energy delivery, yet retain the basic simplicity required to achieve reliable operation.

SUMMARY OF THE INVENTION

The method of the invention comprehends intensity modulating the transmitted high energy laser beam by means of beam angle and/or beam focus dither. Reflected beam energy is detected and demodulated to provide a phase error signal that is used in a servo controlled beam directing apparatus. Beam angle dither is accomplished in systems having relatively small transmitting or slewing mirrors by rotating the mirror about one or more axes at a given oscillation rate. For systems having large slewing mirrors a small aperture mirror that can be readily oscillated is used to angle dither a small portion of the transmitted beam only.

It is a principal object of the invention to provide a new and improved method of operating a high energy laser pointing and tracking system.

It is another object of the invention to provide an adaptive high energy laser pointing and tracking system that is capable of optimum energy delivery and that retains the basic simplicity required to achieve reliable operation.

It is another object of the invention to provide an adaptive high energy laser pointing and tracking system having closed loop tracking controls responsive to error signals derived from beam angle/focus dither modulation.

It is another object of the invention to provide a high energy pointing and tracking system utilizing a beam angle/focus dither method of operation in which dither modulation is induced in a small portion of the transmitted beam only.

These, together with other objects, features and advantages of the invention will become more readily apparent from the following detailed description taken in conjunction with the accompanying drawings.

DETAILED DESCRIPTION OF PREFERRED EMBODIMENT

Figure 1:
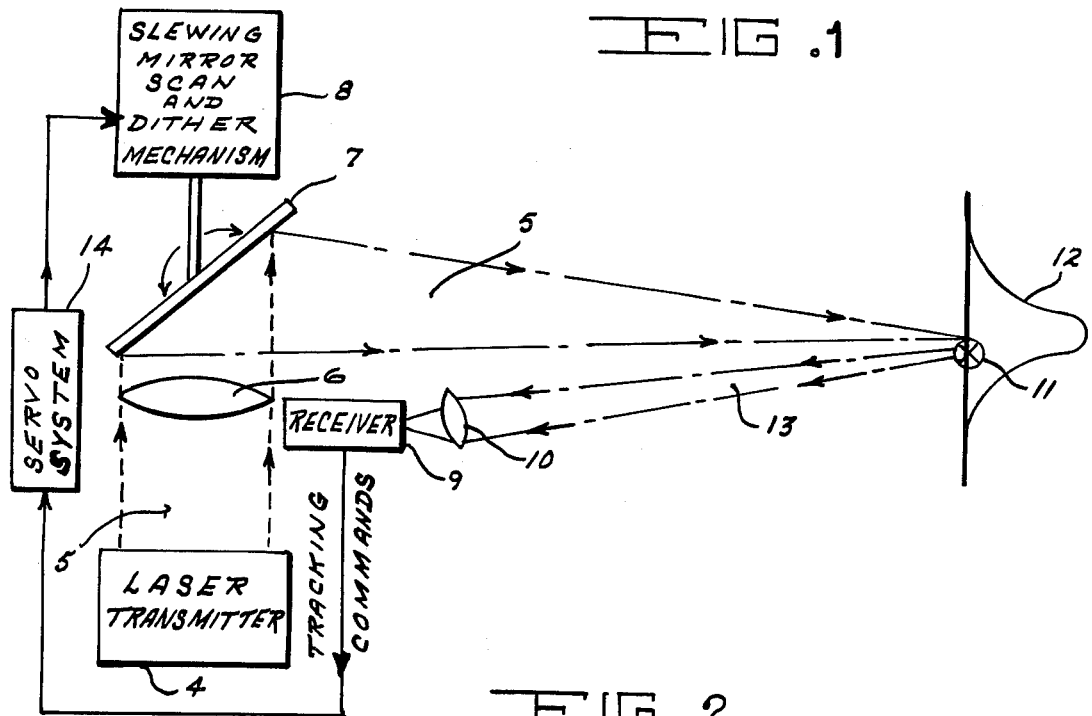
FIG. 1 is a block diagram of one presently preferred embodiment of the invention.

The basic operation of the beam dither algorithm comprehended by the invention is conceptually illustrated by the high energy laser system of FIg. 1. The system consists essentially of a laser transmitter 4, a laser optics system comprising focusing lens 6, slewing mirror 7, and other conventional optical components, scan and dither mechanism 8, servo system 14, receiver 9 and beam collecting lens 10. A high power laser beam 5 is generated by the laser transmitter and is transmitted through the optics and scanning system to target 11. Curve 11 illustrates the far field pattern of the beam. Reflected energy 13 is collected by lens 10 and receiver 9.

Two independent control systems, focus and angle, are required to maximize energy at the target, but since both operate on the same principle only the angle control will be described. By rotating the slewing mirror 7 at a given rate, the amount of energy 13 reflected to the receiver 9 is changed at the same rate, dependent upon the beam intensity profile and the relative position of the target with respect to the angular position of the beam. Thus, an intensity modulation is introduced which when detected by the receiver forms the basis of an error detecting servo system.

Figure 3:
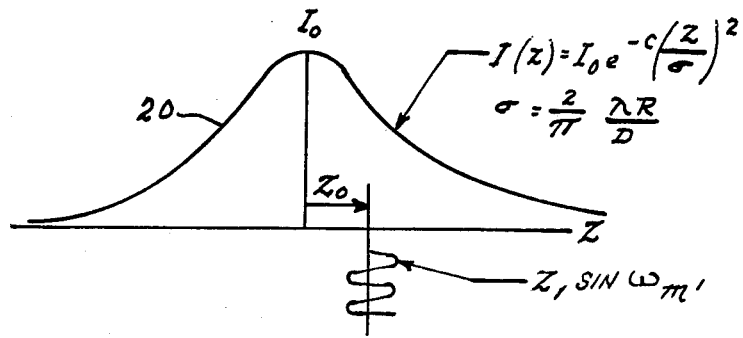
FIG. 3 is a curve illustrating a Gaussian distributed far field pattern of the invensity modulated beam in the target plane.

In order to illustrate the theory and operation of such a system reference is now made to curve 20 of FIG. 3. In the following explanation the energy is assumed to be Gaussian distributed at the target.

By introducing an angle dither of amplitude $Z_1$, the intensity at the receiver is approximated by $$I(t) = \alpha I_o e^{-c(\frac{z}{\sigma})^2} \cong K I_o \left[ 1 - \frac{2 z_o z_1}{\sigma^2} \sin\omega_m t \right] \quad (1)$$

where $\alpha$ = collection factor of optical system $$I_o e^{-c}\left(\frac{z}{\sigma}\right)^2$$

is the function of curve 20 of FIG. 3, K is the system proportionality constant, $\sin\omega_m t$ is the dither function, $Z_o$ is the dither function offset and $Z_1$ is the dither function amplitude. Thus, the a–c component is proportional to the offset, $z_o$, and the dither amplitude $z_1$. Since $z_o$ may be positive or negative, phase information is available and a servo system can be implemented.

$$\sigma = \frac{2}{\pi} \frac{\lambda R}{D}$$

R equals the range to the target and D equals the diameter of the limiting aperture.

The receiver output signal is then $$s(t) = K_o K I_o (2 \frac{z_0 z_1}{\sigma^2} \sin\omega_m t) \quad (2)$$

where $K_o$ = detector responsivity. In terms of signal to noise $$SNR = \frac{2\alpha I_0 z_0 z_1}{\sigma^2 (NEP)} \quad (3)$$

where NEP is the noise equivalent power of the detector. For SNR = 1, the basic tracking accuracy is defined as $$z_o = \frac{\sigma^2 (NEP)}{2\alpha I_0 z_1} . \quad (4)$$

As expected, the tracking ability is inversely proportional to the amount of energy reflected from the target which is dependent upon source power and the transmitter aperture configuration. Of further interest is the inverse dependence upon the dither amplitude, $z_1$. The larger this factor is, the better the tracking accuracy. (However, this effect can be pursued only to a practical limit in that the induced beam jitter degrades the energy density at the target.) Of course this presents an area for trade-off analysis in a parametric manner.

It is pointed out that no requirements as to the type of target (extended, glint, diffuse, etc.) are imposed upon the system. That is, the control algorithm requires only that sufficient signal-to-noise ratio be present for data processing. Thus, any type of target return can be accommodated and tracked.

One minor restriction is placed upon successful operation by the transit time to the target. Since phase information is required by the servo, an ambiguity will exist if the dither frequency is too large. That is, a sign reversal occurs unless $$\phi = 2\pi f_d (\frac{2R}{C}) < \pi$$

$$f_d < \frac{C}{4R} \quad (5)$$

where $\phi$ is the phase shift angle, $f_d$ is the dither frequency and R is the range to target.

Good engineering practice requires that the modulation rate be 1/10 of the limiting value. Thus, $$f_d < \frac{C}{40R} . \quad (6)$$

For a range of $3 \times 10^5$m, $$f_d < \frac{3 \times 10^8}{40 (3 \times 10^5)} = 25 \, Hz \quad (7)$$

Since massive mirrors would be required for HEL systems, on the surface there does not appear to be a problem and one could choose a dither rate of 1 Hz. However, the acquisition time to lock onto the target is inversely proportional to the modulation rate and 1 Hz would correspond to 1 to 3 sec. With fast moving targets, such a "lock-on" time would be intolerable. In order to avoid this penalty, fast rates are required and for the example 40–100 msec could be realized at 25 Hz. To this end, another optical configuration has been conceived, which operates on the same basic dither principle. A small portion of the transmitted beam is used to determine both tracking and focus information. Faster modulation rates can be implemented with attendant reduction in acquisition time. In addition, several important advantages are inherent to the system and are now described in this second embodiment of the invention.

Figure 2:
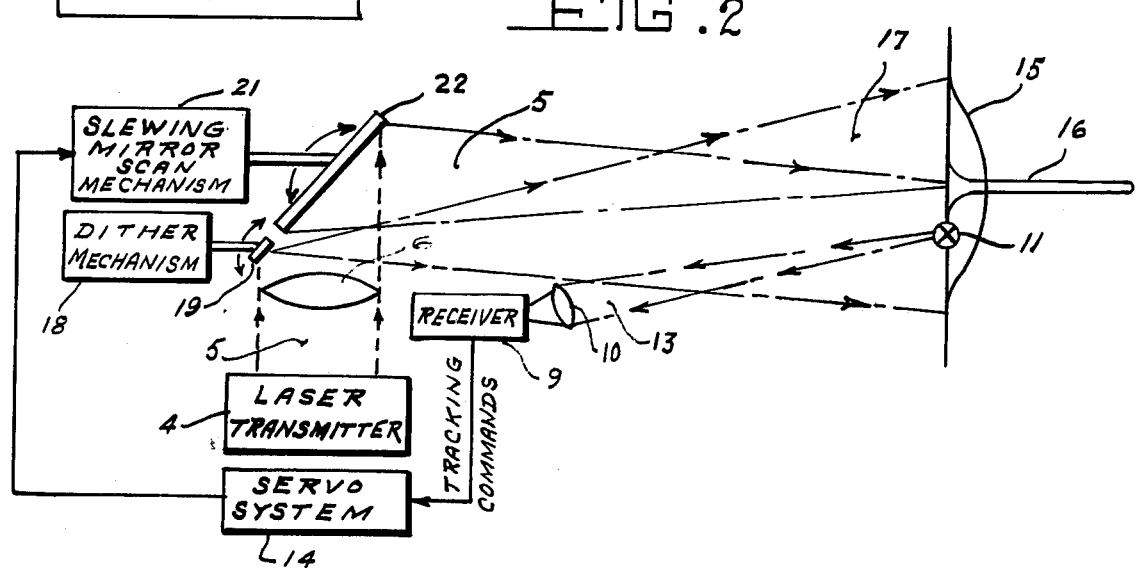
FIG. 2 is a block diagram of another embodiment of the invention.

This embodiment which is termed a subaperture dither control system is shown in FIG. 2 and illustrates the changes which are required to implement the approach. In this arrangement the slewing mirror 7 of FIG. 1 has been replaced by a small aperture or segment mirror 19 and a large scanning mirror 22. This scanning mirror is directed by means of scan mechanism 21. Angle dither is imparted to a small portion 17 of the main beam 5 by means of small aperture mirror 19 and dither mechanism 18. Curves 15 and 16 illustrate the far field pattern of beam 17 and beam 5, respectively. In operation a small portion of the high energy beam (or an auxiliary beam) is angle dithered at the target through the motion applied to mirror 19. Signal processing to achieve acquisition/tracking is the same as previously described. However, the amount of energy received is naturally less since only a fraction of the total power is diverted by mirror 19 and the smaller aperture introduces a larger beam at the target 11. This reduction in signal is more than offset by the system advantages which accrue for this approach.

First, as previously discussed, the dither frequency can be greatly increased due to the reduced mass of the smaller mirror. The net effect is a much faster acquisition "lock-on" time and a better information rate to perform the tracking function. Effects of changes in the propagation path will also be greatly reduced. In addition, since a two-axis dither will be necessary, this approach is more flexible in that different frequencies can be applied to the independent scan axes. Thus, conical or ellipsoidal scans are easily implemented. When interrogating extended targets or targets of unknown structure, the probability of achieving a return signal can be increased with changing scan patterns.

A very important feature of the invention is the inherent ability to direct the main beam 5 to some point in space other than the tracking point. Since mirror 19 performs the tracking function and slewing mirror 22 can be independently controlled with respect to a mutual reference plane, the system can be manually controlled while maintaining adaptive tracking and lead angle compensation.

Another advantage results when considering the interactive effects of the beam and the target. It is possible that the return energy will exhibit "speckle-effect". If the receiver diameter were made equal to or less than the subaperture transmitter diameter, the return signal would be intermittent as a result of radiation lobes traversing the aperture due to target motion. The net effect would be a serious degradation of system operation. By requiring the area of the receiver aperture to be larger than the subaperture transmitter, this deleterious effect can be averaged out and effectively eliminated.

Finally, the approach described herein is not dependent upon the character of the target return for successful operation. Glints, diffuse areas, or edges can be tracked with equal ease. The only requirement is one of adequate signal-to-noise, which of course is required by all approaches.

While the invention has been described in its presently preferred embodiments it is understood that the words which have been used are words of description rather than words of limitation and that changes within the purview of the appended claims may be made without departing from the scope and spirit of the invention in its broader aspects.

What is claimed is:

1. The method of operating a high energy laser pointing and tracking system having a high energy laser beam source, a slewing mirror for directing the laser beam generated thereby and a reflected beam energy detecting means, said method comprising the steps of
   positioning a small aperture mirror proximate said slewing mirror and in intercepting relationship with said laser beam,
   scanning said small aperture mirror in substantially the same plane as said slewing mirror,
   intensity modulating the portion of laser beam transmitted by said small aperture mirror by induced beam angle dither,
   demodulating reflected beam energy received by said reflected beam detecting means to provide phase error signals, and
   controlling the direction of said slewing mirror by means of an error detecting servo system, said servo system being responsive to said phase error signals.

2. A high energy laser pointing and tracking system comprising
   a high energy laser beam source,
   an optical system including a slewing mirror for transmitting the laser beam generated thereby,
   a small aperture mirror proximate to said slewing mirror and in intercepting relationship with said laser beam, said small aperture mirror being scannable in substantially the same plane as said slewing mirror,
   angle dither means for intensity modulating the portion of laser beam transmitted by said small aperture mirror,
   reflected laser beam energy detecting means adapted to demodulate received laser energy and provide therefrom error signals,
   scanning means for directing said slewing mirror, and
   a servo system responsive to said phase error signals connected to operate said scanning means.

* * * * *